US011129016B2

(12) United States Patent
Wang

(10) Patent No.: US 11,129,016 B2
(45) Date of Patent: Sep. 21, 2021

(54) METHOD AND DEVICE FOR NETWORKING BETWEEN DEVICES

(71) Applicant: HUAWEI TECHNOLOGIES CO., LTD., Guangdong (CN)

(72) Inventor: Tuo Wang, Xi'an (CN)

(73) Assignee: Huawei Technologies Co., Ltd., Shenzhen (CN)

(*) Notice: Subject to any disclaimer, the term of this patent is extended or adjusted under 35 U.S.C. 154(b) by 400 days.

(21) Appl. No.: 16/327,227

(22) PCT Filed: Dec. 30, 2016

(86) PCT No.: PCT/CN2016/113850
§ 371 (c)(1),
(2) Date: Feb. 21, 2019

(87) PCT Pub. No.: WO2018/036071
PCT Pub. Date: Mar. 1, 2018

(65) Prior Publication Data
US 2019/0182663 A1 Jun. 13, 2019

(30) Foreign Application Priority Data

Aug. 21, 2016 (CN) .......................... 201610700353.1

(51) Int. Cl.
*H04L 29/06* (2006.01)
*H04L 9/32* (2006.01)
(Continued)

(52) U.S. Cl.
CPC ......... *H04W 12/03* (2021.01); *H04L 63/0442* (2013.01); *H04W 12/04* (2013.01);
(Continued)

(58) Field of Classification Search
CPC ..... H04W 12/03; H04W 76/10; H04W 12/50; H04W 63/0442; H04W 12/06;
(Continued)

(56) References Cited

U.S. PATENT DOCUMENTS 8,296,558 B1 10/2012 Chowdhury
2010/0050244 A1* 2/2010 Tarkhanyan ............ G06F 21/88
726/7
(Continued)

FOREIGN PATENT DOCUMENTS

CN 101765057 A 6/2010
CN 102946605 A 2/2013
(Continued)

OTHER PUBLICATIONS

Office Action issued in Chinese Application No. 201680065870.4 dated Nov. 27, 2019, 19 pages (with English translation).
(Continued)

*Primary Examiner* — Haresh N Patel
(74) *Attorney, Agent, or Firm* — Fish & Richardson P.C.

(57) ABSTRACT

A method for networking between devices, including: connecting to, by a user mobile phone C, a primary router A, and detecting a nearby device B that can be networked; tapping, by a user on the user mobile phone C, a button for adding the device B, to send information about the to-be-added device B to the primary router A; after receiving a message sent by the mobile phone C, obtaining, by the primary router A, the SSID of the to-be-added device B, and sending a notification message to the SSID (the message needs to include an SSID and a password of the router A that need to be encrypted) to instruct B to connect to the primary router A; and after receiving the SSID and the password of the primary router A, connecting to, by the device B, the primary router A, so that the device is added.

20 Claims, 2 Drawing Sheets

(51) Int. Cl.
*H04W 12/06* (2021.01)
*H04W 12/03* (2021.01)
*H04W 12/04* (2021.01)
*H04W 84/12* (2009.01)
*H04W 76/10* (2018.01)
*H04W 84/18* (2009.01)
*H04W 48/08* (2009.01)
*H04W 12/50* (2021.01)
*H04W 40/24* (2009.01)
*H04W 4/50* (2018.01)
*H04W 12/73* (2021.01)

(52) U.S. Cl.
CPC ........... *H04W 12/06* (2013.01); *H04W 12/50* (2021.01); *H04W 40/244* (2013.01); *H04W 48/08* (2013.01); *H04W 76/10* (2018.02); *H04W 84/12* (2013.01); *H04W 84/18* (2013.01); *H04W 4/50* (2018.02); *H04W 12/73* (2021.01)

(58) Field of Classification Search
CPC ... H04W 40/244; H04W 48/08; H04W 84/12; H04W 84/18
USPC .......................................................... 713/153
See application file for complete search history.

(56) References Cited

U.S. PATENT DOCUMENTS

| | | | |
|---|---|---|---|
| 2010/0194632 A1* | 8/2010 | Raento | H04W 4/02 342/357.25 |
| 2012/0010923 A1* | 1/2012 | Yarmolich | G06Q 30/0201 705/7.32 |
| 2012/0054493 A1* | 3/2012 | Bradley | H04W 8/005 713/171 |
| 2012/0230491 A1 | 9/2012 | Duo et al. | |
| 2012/0272077 A1* | 10/2012 | Dow | G06F 1/3206 713/310 |
| 2013/0272164 A1 | 10/2013 | Leonardos et al. | |
| 2014/0032951 A1* | 1/2014 | Garg | H04W 52/0219 713/323 |
| 2014/0059351 A1* | 2/2014 | Braskich | G06F 21/36 713/171 |
| 2014/0082369 A1* | 3/2014 | Waclawsky | G06F 21/62 713/189 |
| 2014/0136830 A1* | 5/2014 | Chan | H04L 67/26 713/2 |
| 2014/0164750 A1* | 6/2014 | Tang | G06F 9/45558 713/1 |
| 2014/0258723 A1 | 9/2014 | Zhang | |
| 2014/0380382 A1* | 12/2014 | Gupta | H04N 21/44227 725/61 |
| 2015/0052357 A1* | 2/2015 | Bahr | H04L 63/08 713/168 |
| 2015/0200921 A1* | 7/2015 | Linga | H04L 63/061 713/171 |
| 2016/0007198 A1* | 1/2016 | Lacey | H04W 8/22 713/156 |
| 2016/0112410 A1* | 4/2016 | Nedeltchev | H04L 63/0838 713/156 |
| 2016/0143069 A1 | 5/2016 | Xie et al. | |
| 2016/0174140 A1* | 6/2016 | Wu | H04L 63/0876 370/329 |
| 2016/0255077 A1* | 9/2016 | Lee | H04W 12/37 713/159 |
| 2017/0374552 A1* | 12/2017 | Xia | H04W 12/08 |
| 2018/0012134 A1* | 1/2018 | Shetye | H04L 63/0876 |
| 2018/0367539 A1 | 12/2018 | Huang et al. | |

FOREIGN PATENT DOCUMENTS

| | | |
|---|---|---|
| CN | 103139768 A | 6/2013 |
| CN | 103532803 A | 1/2014 |
| CN | 203801076 U | 8/2014 |
| CN | 104144522 A | 11/2014 |
| CN | 104202799 A | 12/2014 |
| CN | 104540126 A | 4/2015 |
| CN | 105101464 A | 11/2015 |
| CN | 105392133 A | 3/2016 |
| CN | 105578470 A | 5/2016 |
| CN | 105933895 A | 9/2016 |
| CN | 106304002 A | 1/2017 |
| WO | 2016054767 A1 | 4/2016 |

OTHER PUBLICATIONS

Office Action issued in Chinese Application No. 201680065870.4 dated Sep. 24, 2020, 18 pages (with English translation).
Extended European Search Report issued in European Application No. 16914091.0 dated May 23, 2019, 8 pages.
Office Action issued in Chinese Application No. 201680065870.4 dated May 28, 2020, 17 pages (with English translation).
IEEE Std 802.11-2007, "IEEE Standard for Information technology—Telecommunications and information exchange between systems—Local and metropolitan area networks—Specific requirements," Part 11: Wireless LAN Medium Access Control (MAC) and Physical Layer (PHY) Specifications, IEEE Computer Society, dated Jun. 12, 2007, 1232 pages.
PCT International Search Report and Written Opinion issued in International Application No. PCT/CN2016/113850 dated May 4, 2017, 17 pages (with English translation).

* cited by examiner

METHOD AND DEVICE FOR NETWORKING BETWEEN DEVICES

This application is a national stage of International Application No. PCT/CN2016/113850, filed on Dec. 30, 2016, which claims priority to Chinese Patent Application No. 201610700353.1, filed on Aug. 21, 2016. Both of the aforementioned applications are hereby incorporated by reference in their entireties.

TECHNICAL FIELD

The present invention relates to the communications field, and in particular, to a method and a device for networking between devices.

BACKGROUND

With the popularity of the Internet of Things and smart household, interworking between a plurality of devices has become one of key selling points of each product. For this reason, Huawei develops a HiLink connection protocol for resolving a problem of interworking between different devices of different vendors.

A first step of interworking is networking. However, when a mobile application (App) is used to add a device (perform networking), a mobile phone needs to automatically reconnect to a specified SSID (an SSID of a router). This causes a relatively large quantity of problems.

The existing HiLink connection protocol provides a method for networking between devices, as shown in FIG. 1. The method includes the following steps.

Step 1: A user mobile phone C connects to a primary router A to obtain a WiFi connection, and obtains, from the primary router A, information about a nearby device B that is detected by the primary router A and that can be used for networking. A user taps a button on the user mobile phone C to add the device B to a WiFi network established by the user mobile phone C and the primary router A.

Step 2: The user mobile phone C automatically connects to the to-be-added device B, and sends an SSID and a password of the primary router A to the device B.

Step 3: The device B connects to the primary router A after receiving the SSID and the password of the router A.

Step 4: The user mobile phone C reconnects to the primary router A to re-obtain the WiFi connection (so that the user does not sense disconnection and reconnection of the WiFi connection).

This method has one or more of the following problems:

1. It takes a long time to add a device.

A mobile phone needs to perform WiFi connection twice, which takes a long time.

2. Reliability is low.

WiFi reconnection depends on stability of a connection between a router and a terminal device. The WiFi reconnection may fail and is error-prone.

SUMMARY

Embodiments of the present invention provide a method and a device for networking between devices, so as to improve efficiency and reliability of networking between devices.

The embodiments of the present invention include any one of the following:

1. A method for networking between devices, including:
establishing, by a router A, a WiFi connection to a device C to constitute a WiFi network;
sending, by the router A, information about a detected nearby device B to the device C, where the information about the device B includes an SSID of the device B;
receiving, by the router, a first message sent by the device C, where the first message carries the information about the device B, and the first message is used to instruct the router A to add the device B to the WiFi network; and
sending, by the router A, a second message to the SSID of the device B after receiving the first message sent by the device C, where the second message carries an SSID and a password of the router A, and the second message is used to instruct the device B to use the SSID and the password of the router A to connect to the router A, so as to join the WiFi network.

2. The method according to 1, where the password carried in the second message is encrypted.

3. The method according to 2, where the method further includes: obtaining, by the router A, a public key of the device B before sending the second message, where the password carried in the second message is encrypted by using the public key of the device B.

4. The method according to 3, where the obtaining, by the router A, a public key of the device B includes: receiving, by the router A, a beacon frame that is broadcast by the device B, where the beacon frame carries the public key of the device B; or
sending, by the router A, a probe request frame to the device B, to request to obtain the public key of the device B, and receiving, by the router A, a probe response frame returned by the device B after the device B receives the probe request frame, where the probe response frame carries the public key of the device B.

5. The method according to 4, where that the beacon frame carries the public key of the device B includes: a Vendor Specific field of the beacon frame carries the public key of the device B; and
that the probe response frame carries the public key of the device B includes: a Requested information elements field of the probe response frame carries the public key of the device B.

6. The method according to any one of 1 to 5, where the second message is a data frame.

7. The method according to any one of 1 to 6, where the device C is a mobile phone.

8. A method for networking between devices, including:
establishing, by a device C, a WiFi connection to a router A to constitute a WiFi network;
obtaining, by the device C from the router A, information about a nearby device B detected by the router A, where the information about the device B includes an SSID of the device B; and
after receiving a user-entered instruction for adding the device B, sending, by the device C, a first message carrying the information about the device B to the router A, where the first message is used to instruct the router A to add the device B to the WiFi network,
so that the router A sends a second message to the device B after receiving the first message sent by the device C, where the second message carries an SSID and a password of the router A, and the second message is used to instruct the device B to use the SSID and the password of the router A to connect to the router A, so as to join the WiFi network.

9. A device, where the device includes a memory, a processor, and a transceiver, where the memory is configured to store an instruction; and the processor is configured to invoke the instruction stored in the memory to control the transceiver to perform the method according to any one of 1 to 8.

10. A router, where the router is a router A, and the router A includes a memory, a processor, and a transceiver, where the memory is configured to store an instruction; and the processor is configured to invoke the instruction stored in the memory to control the transceiver to perform the following operations:

establishing a WiFi connection to a device C to constitute a WiFi network;

sending information about a detected nearby device B to the device C, where the information about the device B includes an SSID of the device B;

receiving a first message sent by the device C, where the first message carries the information about the device B, and the first message is used to instruct the router A to add the device B to the WiFi network; and sending a second message to the device B after receiving the first message sent by the device C, where the second message carries an SSID and a password of the router A, and the second message is used to instruct the device B to use the SSID and the password of the router A to connect to the router A, so as to join the WiFi network.

11. The router according to 10, where the password carried in the second message is encrypted.

12. The router according to 11, where the processor is further configured to control the transceiver to obtain a public key of the device B before sending the second message, where the password carried in the second message is encrypted by using the public key of the device B.

13. The router according to 12, where obtaining, by the transceiver, the public key of the device B includes: receiving, by the transceiver, a beacon frame that is broadcast by the device B, where the beacon frame carries the public key of the device B; or sending, by the transceiver, a probe request frame to the device B, to request to obtain the public key of the device B, and receiving, by the transceiver, a probe response frame returned by the device B after the device B receives the probe request frame, where the probe response frame carries the public key of the device B.

14. The router according to 13, where that the beacon frame carries the public key of the device B includes: a Vendor Specific field of the beacon frame carries the public key of the device B; and that the probe response frame carries the public key of the device B includes: a Requested information elements field of the probe response frame carries the public key of the device B.

15. The router according to any one of 10 to 14, where the second message is a data frame.

16. The router according to any one of 10 to 15, where the device C is a mobile phone.

17. A device, where the device is a device C, and the device C includes a memory, a processor, a touch display screen, and a transceiver, where the memory is configured to store an instruction; and the processor is configured to invoke the instruction stored in the memory to control the transceiver to perform the following operations:

establishing a WiFi connection to a router A to constitute a WiFi network;

obtaining, from the router A, information about a nearby device B detected by the router A, where the information about the device B includes an SSID of the device B; and after receiving an instruction for adding the device B, sending a first message carrying the information about the device B to the router A, where the instruction is entered by a user by using the touch display screen, and the first message is used to instruct the router A to add the device B to the WiFi network, so that the router A sends a second message to the device B after receiving the first message sent by the device C, where the second message carries an SSID and a password of the router A, and the second message is used to instruct the device B to use the SSID and the password of the router A to connect to the router A, so as to join the WiFi network.

18. The device according to 17, where the password carried in the second message is encrypted.

19. The device according to 18, where the password carried in the second message is encrypted by using a public key of the device B, and the public key of the device B is obtained by the router A before the router A sends the second message.

20. The device according to 19, where the public key of the device B is carried in a beacon frame that is broadcast by the device B; or the public key of the device B is carried in a probe response frame that is returned by the device B after the device B receives a probe request frame sent by the router A, where the probe request frame is used to request to obtain the public key of the device B.

21. The device according to 20, where that the beacon frame carries the public key of the device B includes: a Vendor Specific field of the beacon frame carries the public key of the device B; and that the probe response frame carries the public key of the device B includes: a Requested information elements field of the probe response frame carries the public key of the device B.

22. The device according to any one of 17 to 21, where the second message is a data frame.

23. The device according to any one of 17 to 22, where the device C is a mobile phone.

According to the embodiments of the present invention, WiFi reconnection between the device C and the primary router A is no longer required. Instead, a message is directly sent to the to-be-added device B by using the primary router A, and the to-be-added device B connects to the primary router A after receiving the message. This makes the networking between devices simple and efficient.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and an ordinary person skilled in the art may still derive other drawings from these accompanying drawings.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In a device addition (or referred to as inter-device networking) solution provided by an existing HiLink connection protocol, a user needs to perform WiFi connection twice, and many problems are caused.

The embodiments of the present invention are used to resolve performance and success rate problems caused when a device is networked by using a wireless terminal. According to the embodiments of the present invention, WiFi reconnection is no longer required. Instead, a message is directly sent to a to-be-added device B by using a primary router A, and the to-be-added device B proactively connects to the primary router A after receiving the message. This makes the networking between devices simple and efficient.

Figure 1:
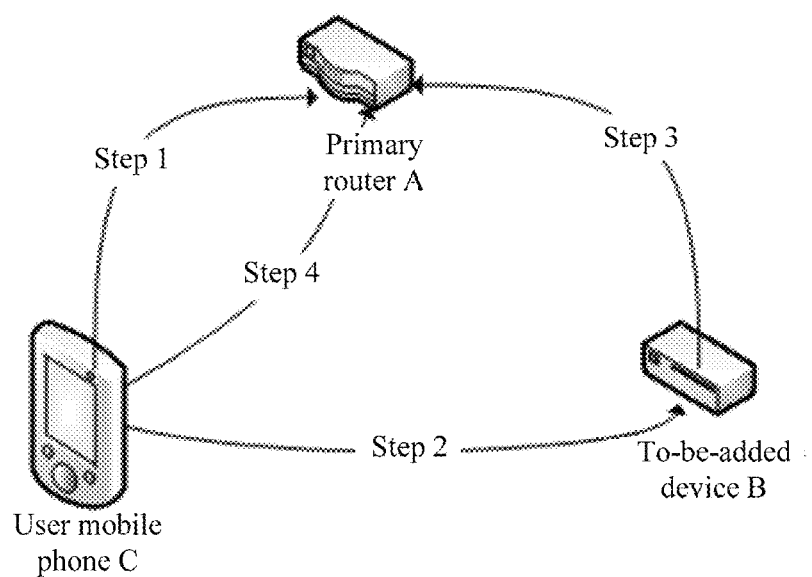
FIG. 1 is a schematic flowchart of a method for networking between devices according to the prior art.
Figure 2:
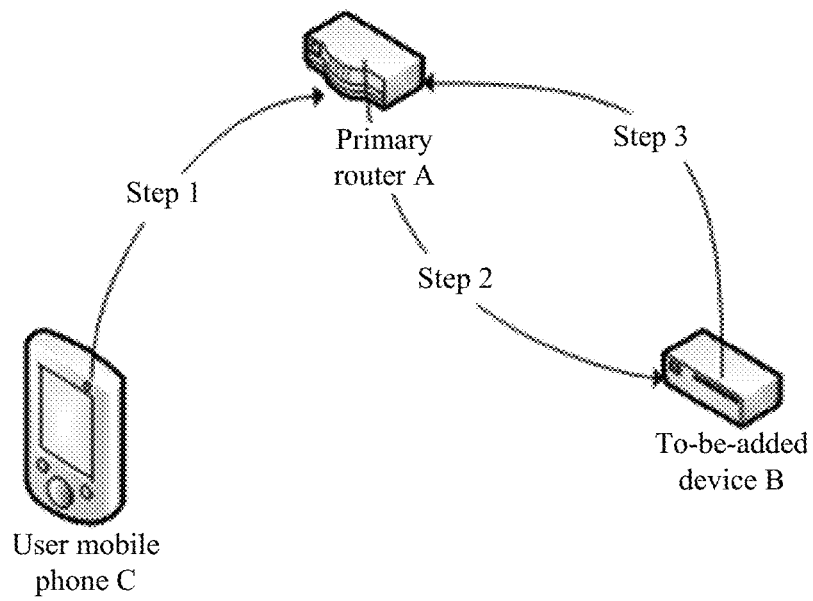
FIG. 2 is a schematic flowchart of a method for networking between devices according to an embodiment of the present invention.

A method embodiment of the present invention is shown in FIG. 2. A user mobile phone C, a primary router A, and a device B may all have a WiFi communications interface. A method may include the following steps.

Step 1: The user mobile phone C connects to the primary router A (that is, the router A used for dial-up access) to constitute a WiFi network with the primary router A, and obtains, from the primary router A, information about the nearby device B that is detected by the primary router A and that can be used for networking (for example, a device that has a WiFi communications interface and that can be used as a secondary router). A user taps a button on the user mobile phone C (for example, a button that is displayed as an icon on a screen of the user mobile phone C) to confirm to add the device B (that is, confirm to add the device B to the WiFi network constituted by the mobile phone C and the primary router A). Then the user mobile phone C adds the information about the to-be-added device B (for example, an SSID (Service Set Identifier, service set identifier) of the device B or other information that can be used to identify the device B) to a first message and sends the first message to the primary router A. The primary router is a router that needs to perform dial-up access, while the secondary router does not need to perform dial-up access. The primary router and the secondary router may be connected to each other in a bridging manner.

Step 2: After receiving the first message sent by the mobile phone C, the primary router A obtains the SSID of the to-be-added device B, and sends a second message to the SSID (the second message needs to include an SSID and a password of the router A, and at least the password needs to be encrypted) to instruct B to connect to it (the primary router A).

Step 3: The device B connects to the primary router A after receiving the SSID and the password of the primary router A, so that device addition is completed and the device B is successfully added to the WiFi network constituted by the mobile phone C and the primary router A.

In step 2, the primary router A sends its SSID and password to the to-be-added device B. This step may be implemented by using the following two optional solutions:

Optional Solution 1:

A probe request frame and a probe response frame are used.

A specific process is as follows:

1. The primary router A sends a probe request frame (Probe Request Frame) to the to-be-added device B, where a tag is added to Request information, indicating that A requests a public key of B from B. A format of the probe request frame is shown in Table 1 (IEEE std 802.11-2007 P84).

TABLE 1

| Sequence | Description | Length |
|---|---|---|
| 1 | SSID | 2-34 |
| 2 | Supported rates | 3-10 |
| 3 | Request information | 2-256 |
| 4 | Extended Supported Rates | 3-257 |
| 5 | Vendor Specific | |

2. The to-be-added device B sends a probe response frame (Probe Response Frame) to the primary router A after receiving the request, where the public key of B is carried in Requested information elements (requested information elements). A format of the probe response frame is shown in Table 2 (IEEE std 802.11-2007 P85).

TABLE 2

| Sequence | Description | Length |
|---|---|---|
| 1 | Timestamp | 8 |
| 2 | Beacon interval | 2 |
| 3 | Capability | 2 |
| 4 | SSID | 2-34 |
| 5 | Supported rates | 3-10 |
| 6 | FH Parameter Set | 7 |
| 7 | DS Parameter Set | 3 |
| 8 | CF Parameter Set | 8 |
| 9 | IBSS Parameter Set | 4 |
| 10 | Country | 8-256 |
| 11 | FH Parameters | |
| 12 | FH Pattern Table | |
| 13 | Power Constraint | 3 |
| 14 | Channel Switch Announcement | 5 |
| 15 | Quiet | 8 |
| 16 | IBSS DFS | 10-255 |
| 17 | TPC Report | 4 |
| 18 | ERP Information | 3 |
| 19 | Extended Supported Rates | 3-257 |
| 20 | RSN | 36-256 |
| 21 | BSS Load | |
| 22 | EDCA Parameter Set | 20 |
| Last-1 | Vendor Specific | |
| Last-n | Requested information elements | |

3. The primary router A uses the public key of B obtained in step 2 to encrypt the SSID and the password of the primary router A (at least the SSID needs to be encrypted), and sends encrypted data to the to-be-added device B by using a data frame.

4. The to-be-added device B uses its private key to decrypt the encrypted data, to obtain the SSID and the password of the primary router A, and uses the SSID and the password of the primary router A to connect to the primary router A, so as to join the WiFi network constituted by the mobile phone C and the primary router A.

Optional Solution 2: (a Beacon Frame is Used)

1. After the to-be-added device B is restored to factory settings and is powered on, when broadcasting WiFi information of the to-be-added device B at regular intervals (a default value may be used) by using a beacon frame (Beacon Frame), the to-be-added device B adds its public key to Vendor Specific (a vendor specific parameter) for broadcast. A format of the beacon frame is shown in Table 3 (IEEE std 802.11-2007 P80-81).

TABLE 3

| Sequence | Description | Length |
|---|---|---|
| 1 | Timestamp | 8 |
| 2 | Beacon interval | 2 |
| 3 | Capability | 2 |
| 4 | Service Set Identifier (SSID) | 2-34 |
| 5 | Supported rates | 3-10 |
| 6 | Frequency-Hopping (FH) Parameter Set | 7 |
| 7 | DS Parameter Set | 3 |
| 8 | CF Parameter Set | 8 |
| 9 | IBSS Parameter Set | |
| 10 | Traffic indication map (TIM) | 4 |
| 11 | Country | 8-256 |
| 12 | FH Parameters | |
| 13 | FH Pattern Table | |
| 14 | Power Constraint | 3 |
| 15 | Channel Switch Announcement | 5 |
| 16 | Quiet | 8 |
| 17 | IBSS DFS | 10-255 |
| 18 | TPC Report | 4 |
| 19 | ERP Information | 3 |
| 20 | Extended Supported Rates | 3-257 |
| 21 | RSN | 36-256 |
| 22 | BSS Load | 7 |
| 23 | EDCA Parameter Set | 20 |
| 24 | QoS Capability | 3 |
| Last | Vendor Specific | |

2. After receiving the public key of B that is broadcast by the to-be-added device B, the primary router A uses the public key of B to encrypt the SSID and the password of the primary router A (optionally, only the password may be encrypted), and sends encrypted data to the to-be-added device B by using a data frame (data frame).

3. The to-be-added device B uses its private key to decrypt the encrypted data, to obtain the SSID and the password of the primary router A, and uses the SSID and the password of the primary router A to connect to the primary router A, so as to join the WiFi network constituted by the mobile phone C and the primary router A.

According to the method for networking between devices provided in the embodiment of the present invention, the user mobile phone (that is, the device C) does not need to establish a WiFi connection to the router (that is, the router A) for a plurality of times. During the networking, the user mobile phone only needs to send a networking request to the connected router (requesting to add the device B to the WiFi network established by the user mobile phone and the router), and the router proactively sends, to the to-be-added device B, information required for establishing a connection, so as to connect the to-be-added device B to the router. This improves networking efficiency and reliability.

The method for networking between devices provided in the embodiment of the present invention may be used not only for the HiLink connection protocol, but also in all 802.11-based networking environments.

Figure 3:
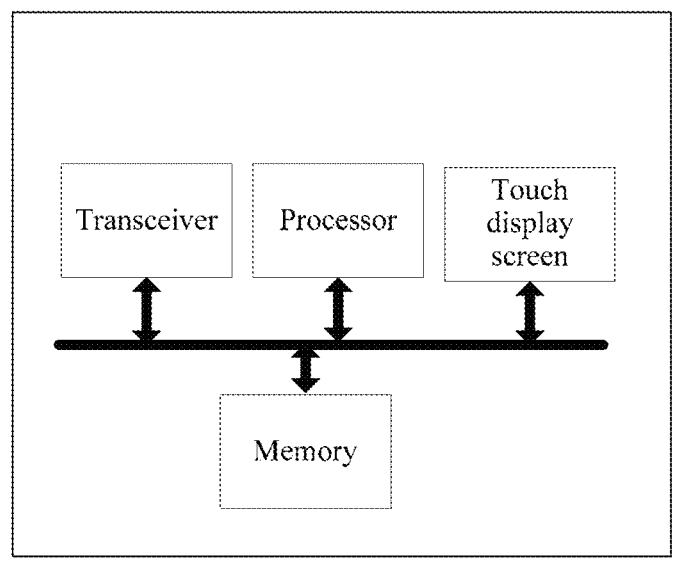
FIG. 3 is a schematic structural diagram of a device according to an embodiment of the present invention.

A schematic structural diagram of a device (which may be the router A or the device C) provided in the embodiments of the present invention is shown in FIG. 3. Modules may be connected by using a bus. If the device is the router, a touch display screen is optional. If the device is the device C, it may be specifically a mobile phone. For a specific structure of the device, reference may be made to an existing mobile phone structure. The device shown in FIG. 3 may be configured to perform the method provided in the foregoing method embodiment. A transceiver may be a WiFi communications module that has a WiFi communications interface.

Related parts of the method embodiments of the present invention may be mutually referenced. The apparatuses provided in the apparatus embodiments are configured to perform the methods provided in the corresponding method embodiments. Therefore, for the apparatus embodiments, refer to related parts in the related method embodiments.

Names of messages/frames, modules, or units provided in the embodiments of the present invention are only examples, and other names may be used provided that functions of the messages/frames, the modules, or the units are the same.

It should be noted that in this specification, relational terms such as first and second are only used to distinguish one entity or operation from another, and do not necessarily require or imply that any actual relationship or sequence exists between these entities or operations. Moreover, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the existence of additional identical elements in the process, method, article, or apparatus that includes the element.

A person of ordinary skill in the art may understand that all or some of the steps of the method in the embodiments may be implemented by a program instructing related hardware. The program may be stored in a readable storage medium of a projection device. When the program runs, all or some of the foregoing steps are performed. The storage medium is, for example, a FLASH or an EEPROM.

In the foregoing specific implementations, the objective, technical solutions, and benefits of the present invention are further described in detail. It should be understood that different embodiments can be combined. The foregoing descriptions are merely specific implementations of the present invention, but are not intended to limit the protection scope of the present invention. Any combination, modification, equivalent replacement, or improvement made without departing from the spirit and principle of the present invention shall fall within the protection scope of the present invention.

What is claimed is:

1. A method for networking between devices, comprising:
   establishing, by a router A, a WiFi connection to a device C to constitute a WiFi network;
   sending, by the router A, information about a detected nearby device B to the device C, wherein the information about the device B comprises a service set identifier (SSID) of the device B;
   receiving, by the router, a first message sent by the device C, wherein the first message carries the information about the device B, and wherein the first message is used to instruct the router A to add the device B to the WiFi network; and
   sending, by the router A, a second message to the SSID of the device B after receiving the first message sent by the device C, wherein the second message carries an SSID and a password of the router A, and wherein the second message is used to instruct the device B to use the SSID and the password of the router A to connect to the router A to join the WiFi network.

2. The method according to claim 1, wherein the password carried in the second message is encrypted.

3. The method according to claim 2, wherein the method further comprises obtaining, by the router A, a public key of the device B before sending the second message, wherein the password carried in the second message is encrypted by using the public key of the device B.

4. The method according to claim 3, wherein the obtaining, by the router A, a public key of the device B comprises:
receiving, by the router A, a beacon frame that is broadcast by the device B, wherein the beacon frame carries the public key of the device B; or
sending, by the router A, a probe request frame to the device B to request to obtain the public key of the device B, and receiving, by the router A, a probe response frame returned by the device B after the device B receives the probe request frame, wherein the probe response frame carries the public key of the device B.

5. The method according to claim 4, wherein that the beacon frame carries the public key of the device B comprises that a Vendor Specific field of the beacon frame carries the public key of the device B; and
that the probe response frame carries the public key of the device B comprises that a Requested information elements field of the probe response frame carries the public key of the device B.

6. The method according to claim 1, wherein the second message is a data frame.

7. A method for networking between devices, comprising:
establishing, by a device C, a WiFi connection to a router A to constitute a WiFi network;
obtaining, by the device C from the router A, information about a nearby device B detected by the router A, wherein the information about the device B comprises a service set identifier (SSID) of the device B; and
after receiving a user-entered instruction for adding the device B, sending, by the device C, a first message carrying the information about the device B to the router A, wherein the first message is used to instruct the router A to add the device B to the WiFi network, wherein:
router A sends a second message to the device B after receiving the first message sent by the device C, wherein the second message carries an SSID and a password of the router A, and wherein the second message is used to instruct the device B to use the SSID and the password of the router A to connect to the router A to join the WiFi network.

8. A router, wherein the router is a router A, and wherein the router A comprises a memory, at least one processor, and a transceiver, wherein:
the memory is configured to store an instruction; and
the at least one processor is configured to invoke the instruction stored in the memory to control the transceiver to perform the following operations:
establishing a WiFi connection to a device C to constitute a WiFi network;
sending information about a detected nearby device B to the device C, wherein the information about the device B comprises a service set identifier (SSID) of the device B;
receiving a first message sent by the device C, wherein the first message carries the information about the device B, and wherein the first message is used to instruct the router A to add the device B to the WiFi network; and
sending a second message to the device B after receiving the first message sent by the device C, wherein the second message carries an SSID and a password of the router A, and wherein the second message is used to instruct the device B to use the SSID and the password of the router A to connect to the router A to join the WiFi network.

9. The router according to claim 8, wherein the password carried in the second message is encrypted.

10. The router according to claim 9, wherein the at least one processor is further configured to control the transceiver to obtain a public key of the device B before sending the second message, wherein the password carried in the second message is encrypted by using the public key of the device B.

11. The router according to claim 10, wherein obtaining, by the transceiver, the public key of the device B comprises:
receiving, by the transceiver, a beacon frame that is broadcast by the device B, wherein the beacon frame carries the public key of the device B; or
sending, by the transceiver, a probe request frame to the device B to request to obtain the public key of the device B, and receiving, by the transceiver, a probe response frame returned by the device B after the device B receives the probe request frame, wherein the probe response frame carries the public key of the device B.

12. The router according to claim 11, wherein that the beacon frame carries the public key of the device B comprises that a Vendor Specific field of the beacon frame carries the public key of the device B; and
wherein that the probe response frame carries the public key of the device B comprises that a Requested information elements field of the probe response frame carries the public key of the device B.

13. The router according to claim 8, wherein the second message is a data frame.

14. A device, wherein the device is a device C, and wherein the device C comprises a memory, at least one processor, a touch display screen, and a transceiver, wherein:
the memory is configured to store an instruction; and
the at least one processor is configured to invoke the instruction stored in the memory to control the transceiver to perform the following operations:
establishing a WiFi connection to a router A to constitute a WiFi network;
obtaining, from the router A, information about a nearby device B detected by the router A, wherein the information about the device B comprises a service set identifier (SSID) of the device B; and
after receiving an instruction for adding the device B, sending a first message carrying the information about the device B to the router A, wherein the instruction is entered by a user by using the touch display screen, and wherein the first message is used to instruct the router A to add the device B to the WiFi network,
wherein the router A sends a second message to the device B after receiving the first message sent by the device C, wherein the second message carries an SSID and a password of the router A, and wherein the second message is used to instruct the device B to use the SSID and the password of the router A to connect to the router A to join the WiFi network.

15. The device according to claim 14, wherein the password carried in the second message is encrypted.

16. The device according to claim 15, wherein the password carried in the second message is encrypted by using a public key of the device B, and wherein the public key of the device B is obtained by the router A before the router A sends the second message.

17. The device according to claim 16, wherein:
the public key of the device B is carried in a beacon frame that is broadcast by the device B; or
the public key of the device B is carried in a probe response frame that is returned by the device B after the device B receives a probe request frame sent by the router A, wherein the probe request frame is used to request to obtain the public key of the device B.

18. The device according to claim 17, wherein that the beacon frame carries the public key of the device B comprises that a Vendor Specific field of the beacon frame carries the public key of the device B, and wherein that the probe response frame carries the public key of the device B comprises that a Requested information elements field of the probe response frame carries the public key of the device B.

19. The device according to claim 14, wherein the second message is a data frame.

20. The device according to claim 14, wherein the device C is a mobile phone.

* * * * *